US011616238B2

(12) United States Patent
Wu et al.

(10) Patent No.: US 11,616,238 B2
(45) Date of Patent: Mar. 28, 2023

(54) ELECTRODE FOR USE IN AN ELECTRICAL ENERGY STORAGE APPARATUS AND A METHOD FOR MANUFACTURING AN ELECTRODE FOR USE IN AN ELECTRICAL ENERGY STORAGE APPARATUS

(71) Applicant: City University of Hong Kong, Kowloon (HK)

(72) Inventors: Shuilin Wu, Kowloon (HK); Kaili Zhang, Kowloon (HK); Wenjun Zhang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 149 days.

(21) Appl. No.: 16/360,370

(22) Filed: Mar. 21, 2019

(65) Prior Publication Data

US 2020/0303746 A1    Sep. 24, 2020

(51) Int. Cl.
| | | |
|---|---|---|
| *H01M 4/80* | (2006.01) | |
| *H01M 4/74* | (2006.01) | |
| *H01M 4/66* | (2006.01) | |
| *H01M 4/38* | (2006.01) | |
| *H01M 4/04* | (2006.01) | |
| *H01M 4/1395* | (2010.01) | |
| *H01M 4/134* | (2010.01) | |
| *H01M 10/052* | (2010.01) | |

(52) U.S. Cl.
CPC ......... *H01M 4/808* (2013.01); *H01M 4/0423* (2013.01); *H01M 4/0428* (2013.01); *H01M 4/0442* (2013.01); *H01M 4/134* (2013.01); *H01M 4/1395* (2013.01); *H01M 4/382* (2013.01); *H01M 4/661* (2013.01); *H01M 4/74* (2013.01); *H01M 10/052* (2013.01)

(58) Field of Classification Search
CPC ..................................... H01M 4/382
See application file for complete search history.

(56) References Cited

U.S. PATENT DOCUMENTS

| | | | | |
|---|---|---|---|---|
| 3,634,144 A | * | 1/1972 | Hanawalt | H01M 4/13 |
| | | | | 148/276 |
| 10,741,835 B1 | * | 8/2020 | Brown | H01M 4/382 |

(Continued)

FOREIGN PATENT DOCUMENTS

JP    2017106051 A  *  6/2017

OTHER PUBLICATIONS

Wu, Shuilin et al. "Lithiophilicity Conversion of the Cu Surface Through Facile Thermal Oxidation: Boosting a Stable Li—Cu Composite Anode Through Melt Infusion". Journal of Materials Chemistry A, vol. 7, No. 10, 2019, pp. 5726-5732. Royal Society of Chemistry (RSC), doi:10.1039/c9ta00466a. (Year: 2019).*

(Continued)

*Primary Examiner* — Robert S Carrico
(74) *Attorney, Agent, or Firm* — Renner Kenner Greive Bobak Taylor & Weber

(57) ABSTRACT

An electrode for use in an electrical energy storage apparatus includes: a carrier structure including a plurality of vacancies thereon; and an active material arranged to undergo chemical reaction during charging and/or discharging of the electrical energy storage apparatus; wherein the active material occupies the plurality of vacancies on the carrier structure.

10 Claims, 5 Drawing Sheets

(56) References Cited

U.S. PATENT DOCUMENTS

| | | | |
|---|---|---|---|
| 2001/0012567 A1* | 8/2001 | Saitoh | C30B 29/16 |
| | | | 428/472 |
| 2002/0028381 A1* | 3/2002 | Heider | H01M 4/485 |
| | | | 429/218.1 |
| 2004/0248394 A1* | 12/2004 | Kobayashi | H01M 14/005 |
| | | | 438/609 |
| 2020/0099039 A1* | 3/2020 | Kaskel | C23C 4/123 |

OTHER PUBLICATIONS

Yu, Baozhi et al. "Nanoflake Arrays of Lithiophilic Metal Oxides for the Ultra-Stable Anodes of Lithium-Metal Batteries". Advanced Functional Materials, vol. 28, No. 36, 2018, p. 1803023. Wiley, https://doi.org/10.1002/adfm.201803023. (Year: 2018).*

Machine translation of JP 2017-106051 A (Year: 2017).*

* cited by examiner

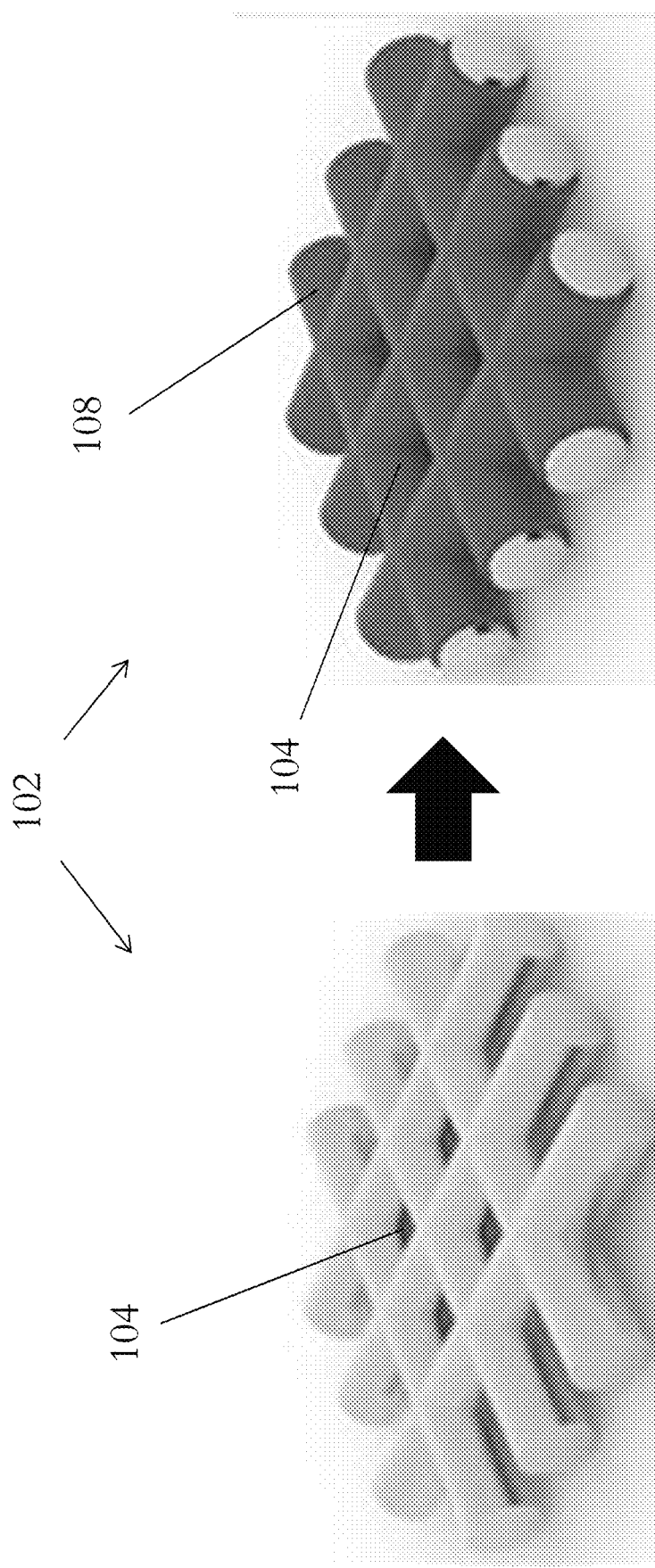

ELECTRODE FOR USE IN AN ELECTRICAL ENERGY STORAGE APPARATUS AND A METHOD FOR MANUFACTURING AN ELECTRODE FOR USE IN AN ELECTRICAL ENERGY STORAGE APPARATUS

TECHNICAL FIELD

The present invention relates to an electrode for use in an electrical energy storage apparatus and a method for manufacturing an electrode for use in an electrical energy storage apparatus, and particularly, although not exclusively, to an electrode having a carrier structure and an active material.

BACKGROUND

Batteries may be used in various portable or cordless devices or apparatus such as watches, mobile phones, power tools and even vehicles for providing source of energy for powering up these devices or apparatus. Depends on the types and amount of material used to build the batteries, these batteries may have different capacities for different applications.

In general, batteries may consist of an anode electrode and a cathode electrode. Whereupon chemicals in the electrode materials react, electrical current may be generated for driving an external electrical/electronic component in a device. In a rechargeable battery, the electrode materials are capable of repeatedly storing and releasing stored energy by means of reversible chemical reaction, and the electrodes may be designed to be repeatedly charged and discharged during the life cycle of the rechargeable battery, and the lifetime of the battery comes to an end when the electrode materials are no longer capable of being charged and/or discharged.

SUMMARY OF THE INVENTION

To solve or reduce at least some of the drawbacks associated with the conventional electrode materials, the present invention discloses an electrode comprising an active material which occupies a plurality of vacancies on a carrier structure.

In accordance with a first aspect of the present invention, there is provided an electrode for use in an electrical energy storage apparatus, comprising: a carrier structure including a plurality of vacancies thereon; and an active material arranged to undergo chemical reaction during charging and/or discharging of the electrical energy storage apparatus; wherein the active material occupies the plurality of vacancies on the carrier structure.

In an embodiment of the first aspect, the active material is further arranged to undergo volume expansion during charging of the electrical energy storage apparatus.

In an embodiment of the first aspect, the carrier structure is arranged to retain the active material in different states during charging and discharging of the electrical energy storage apparatus.

In an embodiment of the first aspect, the carrier structure includes a porous structure.

In an embodiment of the first aspect, the carrier structure includes a foam structure.

In an embodiment of the first aspect, the carrier structure includes a mesh structure.

In an embodiment of the first aspect, the carrier structure is arranged to operate as a current collector in the electrical energy storage apparatus.

In an embodiment of the first aspect, the active material and the current collector combine and form an anode in the electrical energy storage apparatus.

In an embodiment of the first aspect, the carrier structure includes a layer of lithiophilic material on a surface thereof.

In an embodiment of the first aspect, the layer of lithiophilic material includes copper oxide.

In an embodiment of the first aspect, the carrier structure includes copper.

In an embodiment of the first aspect, the active material includes lithium.

In accordance with a second aspect of the present invention, there is provided an electrical energy storage apparatus comprising the electrode in accordance with the first aspect.

In accordance with a third aspect of the present invention, there is provided a method for manufacturing an electrode for use in an electrical energy storage apparatus, comprising the steps of: providing a carrier structure including a plurality of vacancies thereon; and filling the plurality of vacancies on the carrier structure with an active material; wherein the active material is arranged to undergo chemical reaction during charging and/or discharging of the electrical energy storage apparatus.

In an embodiment of the third aspect, the method further comprises the step of transforming a surface of the carrier structure to become lithiophilic.

In an embodiment of the third aspect, the step of transforming the surface of the carrier structure comprises the step of forming a layer of lithiophilic material on the surface of the carrier structure.

In an embodiment of the third aspect, the step of transforming the surface of the carrier structure further comprises the step of oxidizing the surface of the carrier structure.

In an embodiment of the third aspect, the layer of lithiophilic material is formed by thermal oxidation of the carrier structure.

In an embodiment of the third aspect, the layer of lithiophilic material is deposited on the surface of the carrier structure by physical vapour deposition and/or chemical vapour deposition.

In an embodiment of the third aspect, the step of filling the plurality of vacancies on the carrier structure with the active material comprises the step of applying the active material onto the surface of the carrier structure.

In an embodiment of the third aspect, the step of applying the active material onto the surface of the carrier structure comprises the step of placing the carrier structure into molten form of the active material such that the active material occupies the plurality of vacancies on the carrier structure.

In an embodiment of the third aspect, the carrier structure includes copper and the layer of lithiophilic material includes copper oxide.

In an embodiment of the third aspect, the active material includes lithium.

BRIEF DESCRIPTION OF THE DRAWINGS

Embodiments of the present invention will now be described, by way of example, with reference to the accompanying drawings in which:

FIG. 2 is a schematic view of a carrier structure for the electrode in FIG. 1 in accordance with one embodiment of the present invention;

FIG. 3 is a schematic view of a carrier structure for the electrode in FIG. 1 in accordance with one embodiment of the present invention;

DETAILED DESCRIPTION OF THE PREFERRED EMBODIMENT

The inventors have devised that an ever-increasing energy demand in different applications boosts the demand of electrode materials with high energy density and low cost. Among various anode materials, the metallic lithium (Li) may be one preferable option due to its lowest electrochemical potential (−3.040 V vs. standard hydrogen electrode) and highest specific capacity (3860 mAh g-1 or 2061 mAh cm-3). However, the substantial volume change and formation of Li dendrites during cycling have severely impeded the practical application of the Li metal anode.

The expansion of battery material during lithium intercalation may be a concern for the cycle life and performance of lithium ion batteries. Expansion and contraction of the battery material during charging and discharging may lead to the dry-out of the finite electrolyte which accelerates the capacity decay.

In addition, the solid electrolyte interface (SEI) that may prevent continuous reaction between Li and electrolyte would inevitably collapse and form repetitively, which in turn dries out the finite electrolyte and accelerates the capacity decay.

On another hand, the Li dendrites formed inherently during Li plating are likely to piece through the separator and thus trigger internal short-circuit, bringing in severe safety hazards.

Another concern with lithium ion batteries is associated with the lithium dendrites that grow inside the batteries, which can lead to a significant reduction in performance. The presence of the lithium dendrites in the battery can also shorten the battery's lifespan, while simultaneously raising safety concerns and triggering internal short-circuit, or in some instances, catching fire.

In one example embodiment of the present invention, there is shown a novel porous conductive matrix which may simultaneously accommodate the volume change of Li and mitigate the growth of Li dendrites upon cycling. The porous conductive matrix comprises preloaded Li in a conductive porous Cu current collector, which forms a stable Li—Cu composite anode for use in a battery. Advantageously, the electrode is low cost, and has excellent electrical conductivity and electrochemical stability at low voltage (vs. Li+/Li).

Figure 1:
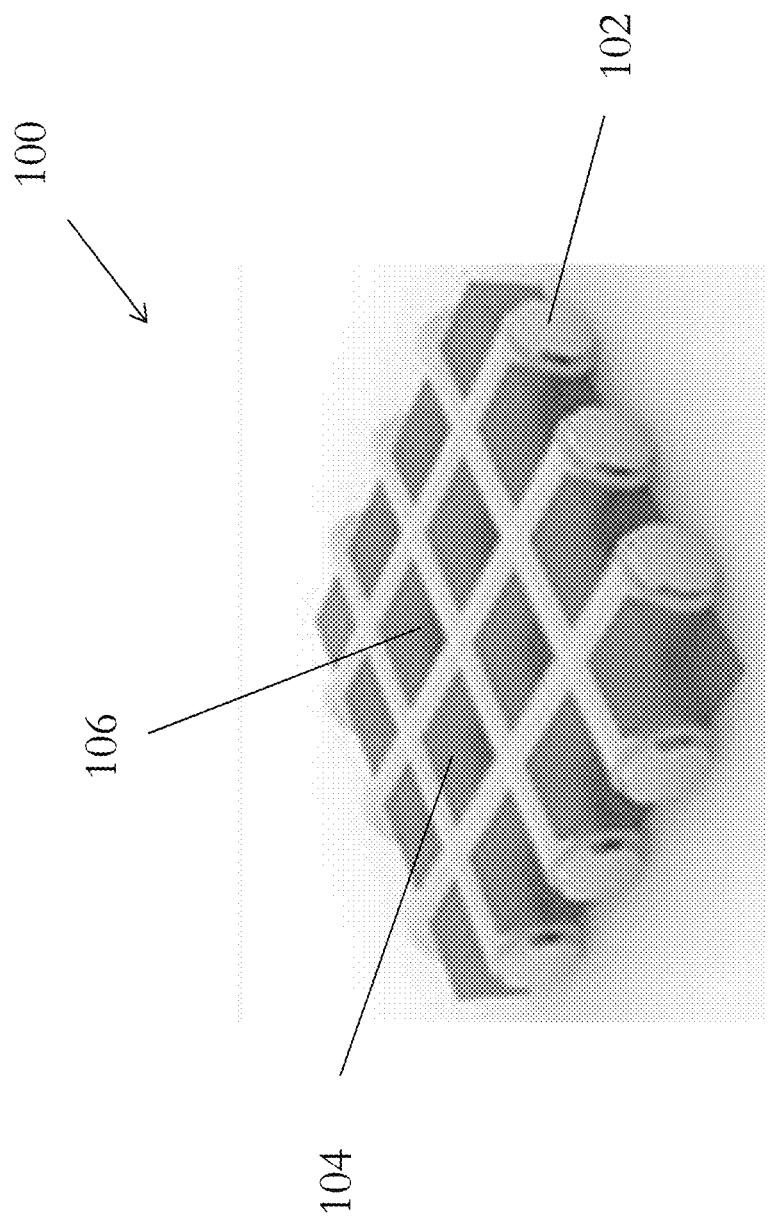
FIG. 1 is a schematic view of an electrode for use in an electrical energy storage apparatus in accordance with one embodiment of the present invention.

With reference to FIG. 1, there is shown an embodiment of an electrode 100 for use in an electrical energy storage apparatus, comprising a carrier structure 102 including a plurality of vacancies 104 thereon; and an active material 106 arranged to undergo chemical reaction during charging and/or discharging of the electrical energy storage apparatus; wherein the active material 106 occupies the plurality of vacancies 104 on the carrier structure 102.

In this embodiment, the electrode 100 includes an active material 106, such as Lithium metal, retained by a carrier structure 102. With reference also to FIG. 2, the carrier structure 102 is substantially planar, and comprises a plurality of regularly-distributed square-shaped vacancies 104 and thus define a mesh structure. Alternatively, the carrier structure 102 may include other porous structures, such as a foam structure, or a scaffold structure.

The carrier structure 102 preferably includes copper material, thus the carrier structure may also operate as a current collector in an electrical storage apparatus, such as a battery. Alternatively, the carrier structure 102 includes any electrically conductive materials such as lead (Pb), zinc (Zn) or graphite, or a dielectric material coated with a layer of conductive material.

Referring to FIG. 1, the carrier structure is a copper mesh 102 which defines a plurality of copper wires arranged to define a plurality of grids 104 which may be used to accommodate an active material of a battery. For example, active material such as Lithium metal 106 may be filled into each of these grids or vacancies 104 to form a Lithium-Copper composite structure.

It will also be appreciated that the plurality of vacancies 104 may have different shapes and sizes, and may be irregularly distributed on the carrier structure 102. The plurality of vacancies 104 on the carrier structure 102 is arranged to accommodate the volume fluctuation of active material 106 during cycling, to suppress the growth of some undesired states of active material 106.

Preferably, the surface of the carrier structure 102 may be lithiophilic such that Lithium may form stable contacts with the carrier structure when being retained in the vacancies in the porous structure. Lithiophilicity may also affect the chemical reactivity of the lithium-based active material, thus it may be preferable to employ a lithiophilic material in the electrode. The lithiophilic surface may facilitate lithium formation on such surface during the operation of the battery.

With reference to FIG. 3, the carrier structure 102 further includes a layer of lithiophilic material 108 on the surface thereof. The layer of lithiophilic material may cover the entire surface of the carrier structure 102, or alternatively, may cover a part of the surface of the carrier structure 102. Preferably, the layer of lithiophilic material 108 includes a metal oxide, for example, copper oxide (CuO). Alternatively, other lithiophilic metal oxides such as but not limited to $MnO_2$, $Co_3O_4$ or $SnO_2$ may be used.

Preferably, the copper oxide layer 108 modifies the lithiophilicity of the copper mesh carrier structure 102, i.e. transforming a lithiophobic (or non-lithiophilic) surface of the copper metal to become lithiophilic. In an example embodiment where lithium is used as the active material 106, the layer of lithiophilic material modifies the property of the carrier structure 102 such that the surface of the carrier structure 102 is no longer lithiophobic, allowing the active material 106 to enter and fill the plurality of vacancies 104 on the carrier structure 102, forming a stable composite electrode 100.

Figure 4:
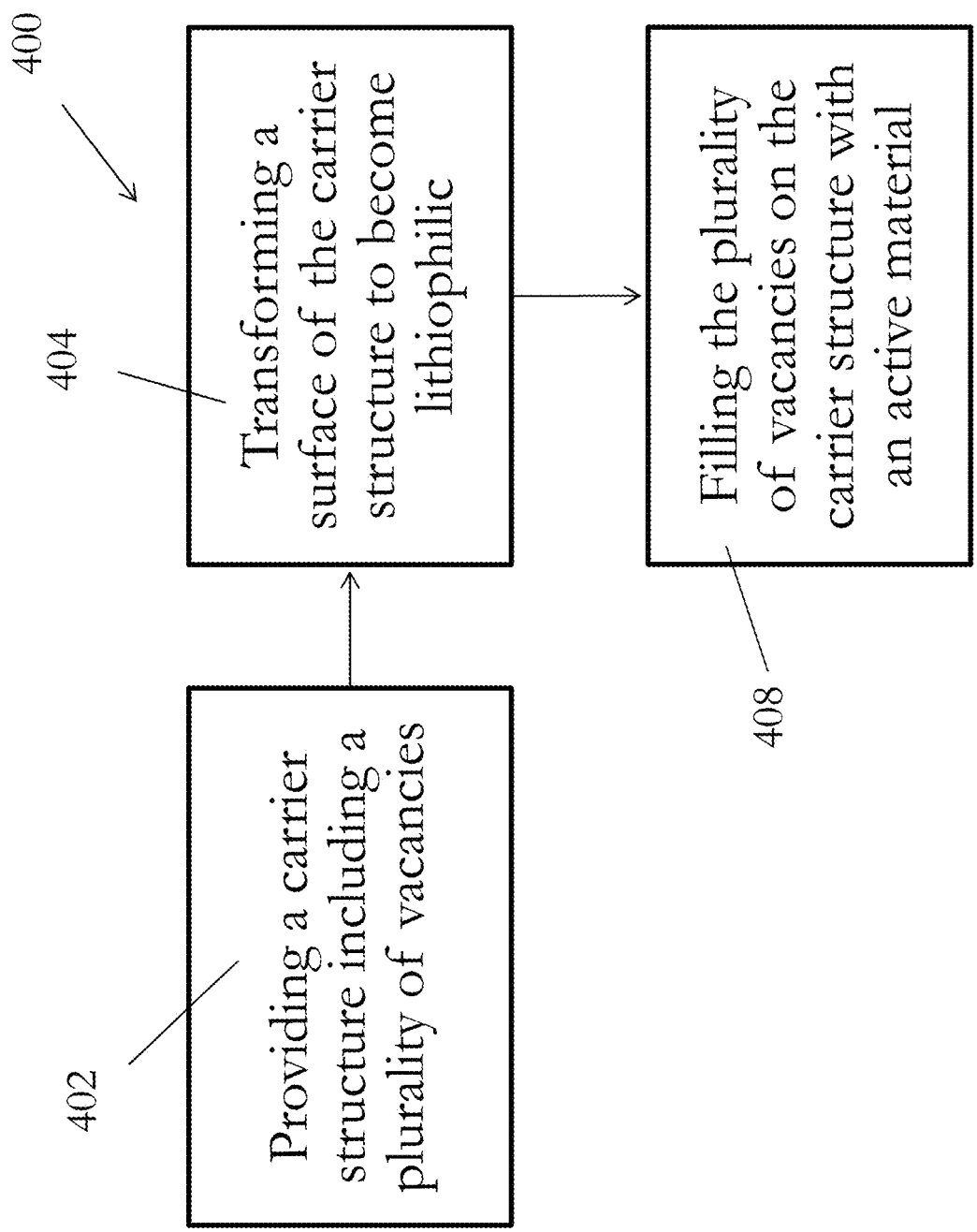
FIG. 4 is a flow chart illustrating a method for manufacturing an electrode for use in an electrical energy storage apparatus in accordance with one embodiment of the present invention.

With reference to FIG. 4, there is provided an example of a method 400 for manufacturing an electrode (e.g. the electrode 100) for use in an electrical energy storage apparatus. The method 400 generally involves preloading an active material into a carrier structure with a plurality of vacancies, thus forming a composite electrode. The method 400 will be discussed hereinafter using the electrode 100 as an example embodiment. In step 402, a carrier structure 102 including a plurality of vacancies 104 thereon is provided.

As discussed above, the carrier structure 102 may include conductive, lithiophobic and porous materials, such as porous Cu or Cu mesh, such that the carrier structure 102 serves as a "host" for the active material 106 during the charging and discharging processes of the electrical energy storage apparatus. Preferably, the plurality of vacancies 104 should cover as least 20% of the surface of the carrier structure 102 for effectively retaining the different states of active material 106.

In step 404, the lithiophobic surface of the carrier structure 102 is transformed to become lithiophilic, which facilitates the lithium filtration in the following step 408. A thin layer of lithiophilic material 108 is first formed on the surface of the carrier structure 102. In an embodiment, the surface of the carrier structure 102 may be oxidized to form the layer of lithiophilic material 108. Preferably, the surface of the carrier structure 102 is oxidized using thermal oxidation, which may be a highly controllable process to form a native oxide layer on the base metal carrier. Alternatively, oxidization of the surface may be performed using chemical oxidation.

It will also be appreciated by a skilled person that various chemical and/or physical methods, other than oxidation, may be utilized to provide the layer of lithiophilic material 108 on the surface of the carrier surface 102, for example, chemical vapour deposition, and physical vapour deposition (such as sputtering and e-beam evaporation).

With continued reference to FIG. 4, in step 408, the plurality of vacancies 104 on the carrier structure 102 is filled with an active material 106 by applying the active material 106 onto the surface of the carrier structure 102. In a preferred embodiment, the carrier structure 102 is placed into molten form of the active material 106, preferably in an inert argon (Ar) environment, such that the active material 106 simultaneously deposits on the surface of the carrier structure 102 and occupies the plurality of vacancies 104 thereon, forming the composite anode 100 for the electrical energy storage apparatus. As appreciated by the skilled person, preparation of the active material 106 may be required prior to placing the carrier structure 102 into molten form of the active material 106. This may include removing an oxidation layer of the active material 106 to increase the purity of the lithium active material, and heating the active material 106 to form the molten form.

Figure 5:
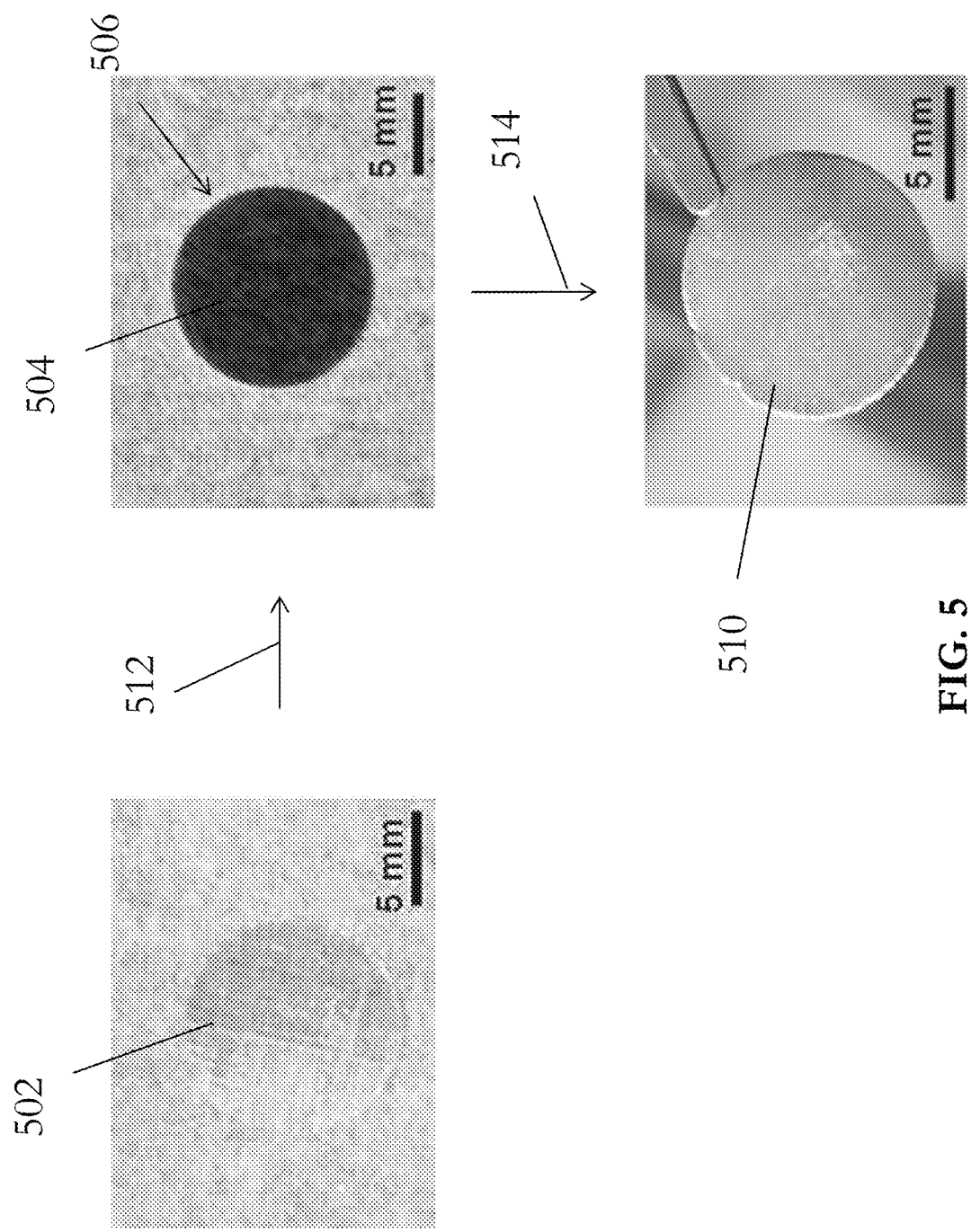
FIG. 5 is a flow diagram illustrating the method in FIG. 4 in accordance with one example embodiment of the present invention.

Referring to FIG. 5, in one example embodiment, a piece of lithiophobic Cu mesh 502 with a plurality of vacancies may be thermally oxidized in order to form a thin, lithiophilic layer of CuO 504 on the Cu mesh 502. In step 512, the Cu mesh 502 was first placed into a muffle furnace and annealed at 300° C. for 6 hours in ambiance. The muffle furnace was then allowed to be cooled down naturally to room temperature, thus forming the black CuO layer 504 on the surface of the Cu mesh 502 and converting the lithiophobic Cu mesh 502 into a lithiophobic CuO—Cu mesh 506. In step 514, Li filtration (or infusion) may be performed, in an Ar-filled glove box, in which the oxygen and moisture concentration was below 0.1 ppm, to fill the plurality of vacancies on the CuO—Cu mesh 506. In this step, Li rod was initially bladed to remove the surface oxidation layer, and then heated to 250° C. to form molten Li. The prepared CuO—Cu mesh 506 was then dipped into the molten Li and held until Li flowed into the CuO—Cu mesh 506, in particular the plurality of vacancies thereon, completely to form the desired Li—Cu composite 510, which may be used as an anode for an electrical energy storage apparatus.

During the process of charging the electrical energy storage apparatus, lithium formation on the electrode may lead to volume expansion, and the additional amount of lithium may be accommodated with the vacancies in the porous structure, therefore the volume fluctuation during intercalation may be suppressed. During discharging, Lithium material "leaves" the occupied vacancies in the porous carrier structure, therefore the process does not result in a substantial change of the volume of the electrode, as the volume of the composite Li—Cu electrode is largely maintained by the carrier structure or the copper mesh.

The porous structure also facilitates Li diffusion during charging with Li formation. The plurality of vacancies 104 on the carrier structure 102 may also facilitate Li stripping/deposition during Li formation, thus forming less dendrites on the electrode 100, as well as merge the dendrites, thus reducing its effect on the efficiency of the electrode 100.

Figure 6:
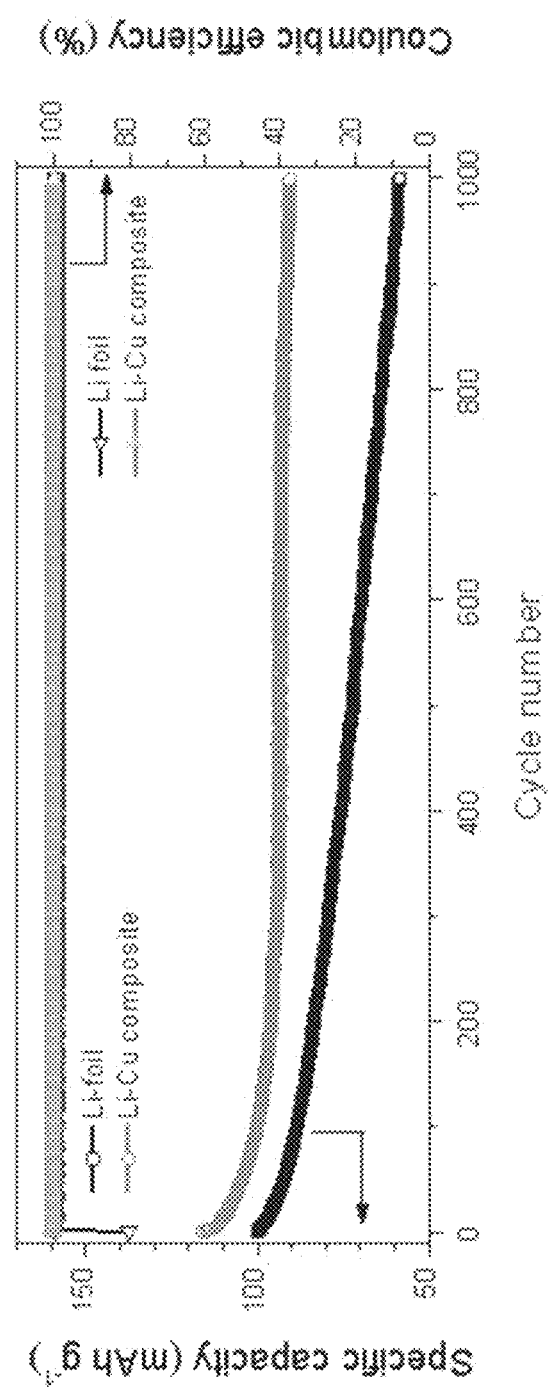
FIG. 6 is a graph showing cyclic performances of Li—Cu composite in FIG. 5 and Li foil in accordance with one example embodiment of the present invention.

With reference to FIG. 6, there is shown a comparison on the electrochemical performances between a conventional Li foil and the novel Li—Cu composite electrode 510 as fabricated using the method referring to FIG. 5. In this experiment, it is demonstrated that the Li—Cu composite electrode 510 exhibits a better electrochemical performance in both symmetric and full cell configurations.

Due to the plurality of vacancies on the Cu mesh matrix 502, the fabricated Li—Cu composite 510 effectively suppresses the growth of the Li dendrites and simultaneously accommodates the volume fluctuation during cycling, while storing electrical energy with a large specific capacity.

The experiment for the cyclic performances of the two electrode materials paired with an example lithium iron phosphate cathode was carried out at 850 mAh g$^{-1}$ for 1000 cycles. The experimental results show a superior capacity retention of 77.6% (90.8 mAh g$^{-1}$) for the fabricated Li—Cu composite anode 510 compared to a capacity retention of 58.4% (58.6 mAh g$^{-1}$) for the Li foil after 1000 cycles, as shown in the graph. In addition, the resulted Li—Cu composite anode 510 also exhibits enhanced rate capability and energy density compared with the Li foil, as used in other Li ion batteries based on graphite anodes.

These embodiments may be advantageous in that, the present invention provides a novel electrode, which may be used as an anode in a secondary Li-based battery. The composite Li—Cu electrode simultaneously accommodates the volume change of Li and mitigates the growth of Li dendrites upon cycling, with an excellent electrochemical performance including dendrites-free Li plating behaviour, low voltage hysteresis and excellent cyclic stability.

In addition, the present invention also provides a simple, scalable and facile fabrication process with low cost to realize mass production of the high-performance electrode.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:
1. A method for manufacturing an anode for use in an electrical energy storage apparatus, comprising steps of:
    providing a copper mesh carrier structure including a plurality of vacancies, the copper mesh carrier structure comprising a surface, the surface being lithiophobic;

annealing the copper mesh carrier structure in a muffle furnace at 300° C. for six hours to thereby modify and transform the lithiophobic surface into a layer of lithiophilic CuO material on the surface of the copper mesh carrier structure, the lithiophilic CuO material including the plurality of vacancies; and filling the plurality of vacancies, following the step of annealing, with an active material including molten lithium;

and wherein the active material is arranged to undergo a chemical reaction during charging and/or discharging of the electrical energy storage apparatus.

2. The method in accordance with claim 1, wherein the step of filling the plurality of vacancies with the active material comprises a step of applying the active material to the lithiophilic CuO material.

3. The method in accordance with claim 1, wherein the step of filling the plurality of vacancies comprises a step of placing the lithiophilic CuO material into a molten form of the active material such that the active material occupies the plurality of vacancies.

4. An anode for use in an electrical energy storage apparatus manufactured according to the method of claim 1.

5. The anode in accordance with claim 4, wherein the active material is further arranged to undergo volume expansion during charging of the electrical energy storage apparatus.

6. The anode in accordance with claim 5, wherein the lithiophilic CuO material is arranged to retain the active material in different states during charging and discharging of the electrical energy storage apparatus.

7. The anode in accordance with claim 4, wherein the lithiophilic CuO material is arranged to operate as a current collector in the electrical energy storage apparatus.

8. The anode in accordance with claim 7, wherein the active material and the current collector combine and form an anode in the electrical energy storage apparatus.

9. An electrical energy storage apparatus comprising the anode in accordance with claim 4.

10. The electrical energy storage apparatus in accordance with claim 9, further comprising a lithium iron phosphate cathode, wherein the electrical energy storage apparatus exhibits a capacity retention of 77.6% at 850 mA $g^{-1}$ for 1000 cycles.

* * * * *